(12) United States Patent
Kato

(10) Patent No.: US 6,288,982 B1
(45) Date of Patent: Sep. 11, 2001

(54) DISK APPARATUS AND METHOD OF LOCATING/DISCRIMINATING DISKS USING THE SAME

(75) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/036,016

(22) Filed: Mar. 3, 1998

(30) Foreign Application Priority Data

Mar. 3, 1997 (JP) .................................................. 9-048242
Mar. 7, 1997 (JP) .................................................. 9-052940

(51) Int. Cl.$^7$ .................................................. G11B 33/02
(52) U.S. Cl. .......................... 369/30; 369/75.2; 369/77.1
(58) Field of Search .................................. 369/75.2, 77.1, 369/30

(56) References Cited

U.S. PATENT DOCUMENTS

| | | | |
|---|---|---|---|
| 4,470,136 | * 9/1984 | Takahashi et al. ................... | 369/77.1 |
| 4,498,162 | * 2/1985 | Schatteman ......................... | 369/77.1 |
| 4,546,396 | * 10/1985 | Schatteman ......................... | 360/96.5 |
| 5,113,388 | 5/1992 | Yamada et al. ...................... | 369/270 |
| 5,173,893 | * 12/1992 | Morikawa et al. ................... | 369/77.1 |
| 5,173,894 | * 12/1992 | Kido ................................... | 369/77.1 |
| 5,204,849 | * 4/1993 | Yamada et al. ...................... | 369/75.2 |
| 5,416,763 | * 5/1995 | Ohsaki ................................ | 369/77.1 |

* cited by examiner

Primary Examiner—Brian E. Miller
(74) Attorney, Agent, or Firm—Brinks Hofer Gilson & Lione

(57) ABSTRACT

A disk apparatus includes a disk driving section having a turntable, a transport mechanism for transporting a disk toward the disk driving section, detection members which abut against the edge of the disk to be transported and move in a direction crossing the disk transport direction in accordance with the peripheral shape of the disk, and a biasing member for biasing the detection members in a direction to be pressed into contact with the edge of the disk and urging the center of the transported disk to coincide with a transport center line passing through the center of the turntable. The disk apparatus also includes a position sensor for detecting the positions of the detection members, and a control section for stopping the disk transported by the transport mechanism when the movement of the disk to a predetermined position over the turntable is detected from an output of the position sensor corresponding to the positions of the detection members. Thus, the detection members move with the movement of the disk and the detection output from the position sensor continuously changes following the movement of the detection members, so that the control section stops the disk transported by the transport mechanism when the output from the position sensor reaches a peak value, whereby the disk is located at a predetermined position over the turntable. In addition, the control section discriminates the diameters of inserted disks on the basis of the amount of movement detected from the output of the position sensor. Therefore, the disk apparatus can certainly locate the disks with a small number of components, and discriminate the diameters of the disks.

19 Claims, 11 Drawing Sheets

DISK APPARATUS AND METHOD OF LOCATING/DISCRIMINATING DISKS USING THE SAME

BACKGROUND OF THE INVENTION

1. Field of the Invention

The present invention relates to a disk apparatus for recording and/or reproducing information on disks such as CDs (compact disks) and DVDs (digital versatile disks), and more particularly, to a disk apparatus including locating means for locating disks on a turntable, and a method of locating/discriminating the disks using the disk apparatus.

2. Description of the Related Art

FIG. 11 illustrates the concept of a conventional disk apparatus.

Referring to FIG. 11, a conventional disk apparatus A has a disk inserting opening 1 in the front (the negative side of the Y axis) thereof, and a disk transport mechanism such as a disk transport roller 2 is provided behind the disk inserting opening 1.

An optical detecting means 4 having a plurality of photo sensors 4a aligned thereon is provided between the disk inserting opening 1 and the transport roller 2. Each photo sensor 4a consists of, for example, a pair of optical members consisting of a light emitting element provided on the side of a cover covering the disk apparatus A and a light receiving element provided on a bottom plate. The photo sensors 4a are aligned in the direction of the X axis perpendicular to the insertion direction (the direction of the Y axis) of a disk D. Thus, when the disk D is inserted into the disk apparatus from the disk inserting opening 1, outputs of the light receiving elements are reversed because light between the light emitting elements and the light receiving elements is blocked. There is difference in the number of the light receiving elements having the reversed outputs due to the difference in diameter of disks such as between an SD (single disk) of 8 cm in diameter and a CD (compact disk) of 12 cm in diameter. Thus, by detecting the number of the light receiving elements having the reversed outputs, the diameter of a disk D, i.e., the SD or the CD is discriminated, and the discrimination data are transmitted to a control section.

A pair of stopper pins 5a and 5b are provided behind a disk driving section 3 having a turntable Ta. The stopper pins 5a and 5b are fixed on a plate (not shown) and are slidable only in the disk transport direction (the direction of the Y axis). When the disk D is not placed in the disk apparatus A, the stopper pins 5a and 5b are aligned at positions (a) close to the disk driving section 3. Therefore, the disk D inserted from the disk inserting opening 1 is transported in the positive direction of the Y axis by the transport roller 2 so as to abut against the stopper pins 5a and 5b. A transporting force for transporting the disk D in the positive direction of the Y axis is continuously applied on the stopper pins 5a and 5b even after the disk D has been abutted against the stopper pins 5a and 5b. Thus, the stopper pins 5a and 5b are pressed by the disk D to move in the positive direction of the Y axis together with the disk D.

However, since the diameter of the disk D has already been discriminated as described above, the moving distance of the stopper pins 5a and 5b responsive to the SD or the CD is controlled by a command from the control section based on the discrimination data. That is, the movement of the stopper pins 5a and 5b is stopped by electrical or mechanical means when the stopper pins 5a and 5b reach predetermined positions. At this time, a center hole D0 of the disk D is located over the turntable Ta of the disk driving section 3. For example, in case the inserted disk D is the SD, the stopper pins 5a and 5b are stopped at positions (b) where they move from the positions (a). In case the inserted disk D is the CD, the stopper pins 5a and 5b are stopped at positions (c) where they move from the positions (a).

The disk D thus transported over the turntable Ta is released from a condition clamped by the transport rollers 2 to be placed on the turntable Ta. Then, the disk D is clamped by a clamp mechanism, etc. on the turntable Ta, and a rotation force due to a motor M provided in the disk driving section 3 is imparted thereto. In addition, information recorded in the disk D is reproduced and/or information is recorded in the disk D by a head member (not shown) which is movable in the radial direction of the disk placed on the turntable Ta.

The above conventional disk apparatus A encounters the following problems.

The first problem relates to the discrimination of the disk D at the time of disk insertion. That is, since it is necessary to provide a plurality of photo sensors 4a consisting of light emitting elements and light receiving elements behind the disk inserting opening 1 in order to discriminate the diameter of the disk D, the number of components increases, thereby increasing the cost of manufacturing the disk apparatus A. In addition, since dust is most likely to enter the place near the disk insertion opening 1, the surfaces of the light emitting elements and the surfaces of the light receiving elements of the photo sensors 4a are contaminated after being used for a long time, so that the detection ability may deteriorate.

Further, if a small number of photo sensors 4a are used for discriminating the diameter of the disk D, resolution decreases. Also, even if foreign matter other than the disk is inserted from the disk inserting opening 1, disk insertion is erroneously detected, so that the transport rollers 2 may be driven to transport the foreign matter into the disk apparatus A.

The second problem relates to reliability when locating the disk D on the turntable Ta.

A distance d between the pair of the stopper pins 5a and 5b is set narrower than the disk D of the smallest diameter (8 cm) such as the SD, and the disk D inserted from the disk inserting opening 1 solidly abuts against the stopper pins 5a and 5b.

However, in case the disk D is inserted into the disk inserting opening 1 in such a manner that it is shifted leftward or rightward from the center of the disk inserting opening 1, the disk D is transported by the transport roller 2 in this shifted condition. The periphery of the disk D may abut against only one of the stopper pins 5a and 5b. In this case, since the disk D is not located at a correct position when the stopper pins 5a and 5b stop, the disk D cannot be placed accurately on the turntable Ta, and therefore the disk D cannot be driven.

SUMMARY OF THE INVENTION

In view of the foregoing problems, it is an object of the present invention to provide a disk apparatus capable of certainly locating disks on a turntable with a small number of components, and a method of locating/discriminating the disks using the disk apparatus.

In order to achieve the above object, according to an aspect of the present invention, there is provided a disk apparatus which includes a disk driving section having a turntable, a transport mechanism for transporting the disk toward the disk driving section, detection members abutting against the edge of the disk to be transported and moving in a direction crossing the disk transport direction in accordance with the peripheral shape of the disk, a biasing member for biasing the detection members in a direction to be pressed into contact with the edge of the disk and allowing the center of the transported disk to coincide with a transport center line passing through the center of the turntable, a position sensor for detecting positions of the detection members, and a control section for stopping the disk transported by the transport mechanism when the movement of the disk to a predetermined position over the turntable is detected from an output of the position sensor corresponding to the positions of the detection members.

A pair of the detection members may be preferably provided at positions symmetrical with respect to the transport center line, and the pair of detection members may be preferably connected by a connecting member so as to each move by the same distance from the transport center line.

In this case, there may be included a locking mechanism for locking the pair of the detection members at positions to abut against the edge of the transported disk and for unlocking the detection members when the edge of the disk abuts against the pair of detection members simultaneously.

In addition, the detection members may be movable parallel to a line which passes through the center of the turntable and is perpendicular to the transport center line of the disk, and the disk may be located at a predetermined position over the turntable when the detection members move to the farthest positions from the transport center line.

Incidentally, the position sensor can detect continuously or intermittently the positions of the detection members. The position sensor may be a linear sensor which detects the positions of the detection members by changes of an electrical resistance value and changes of a magnetic detection value, or may have detection points (optical, magnetic, or mechanical detection points) which are aligned with fine pitches for detecting the positions of the detection members.

According to the disk apparatus of the present invention, the detection members movable in the direction of the X axis perpendicular to the disk insertion direction (the direction of the Y axis) move in the direction of the X axis along the edge of the disk in response to the degree of insertion of the disk. The movement of the detection members in the direction of the X axis is detected by the position sensor, and the detection outputs of the position sensor are monitored by the control section. The control section recognizes, for example, the peak value (the maximum diameter of the disk) of the moving distance of the detection members by the outputs from the position sensor, and detects the movement of the disk to a predetermined position over on the turntable. At this time, the control section can locate the disk at the predetermined position by outputting a signal for stopping the disk transported by the transport mechanism.

According to another aspect of the invention, there is provided a method of locating disks using the disk apparatus of the present invention in which an output value from the position sensor output when the disk is located at the predetermined position over on the turntable is stored in advance in the control section, and the control section outputs a signal for stopping the disk transported by the transport mechanism when the detection output from the position sensor during the transport of the disk agrees with the output value.

When the movement of the detection members to the farthest positions from the transport center line is detected by the position sensor, if the control section is constructed so as to output a signal for stopping the disk transported by the transport mechanism on the basis of the detection output, the output value from the position sensor output when the disk is located at the predetermined ax position on the turntable may not be stored in advance in the control section.

According to a further aspect of the invention, there is provided a method of discriminating disks using the disk apparatus of the present invention in which the control section discriminates the diameters of the disks transported by the transport mechanism on the basis of the amount of movement of the detection members detected by the position sensor. In this case, the control section monitors continuous changes of the output value of the position sensor, and recognizes the amount of movement of the detection members.

Alternatively, when the time period when the disks are moved by predetermined amounts with the edges of the disks abutted against the detection members is taken as t, the control section can discriminate the diameters of the disks on the basis of the amount of movement L of the detection members detected by the position sensor within the time period t. In this case, the control section compares the difference in the amounts of movement L of the detection members with a threshold value (reference value) stored in advance in the control section, whereby the diameters of the disks in transportation are discriminated. The diameters of the disks may be discriminated from the difference in moving speed of the detection members obtained by dividing the amount of movement L by the time period t (L/t).

In addition, the control section may discriminate the diameters of the disks in transportation by monitoring the detection outputs from the position sensor when the disks are transported by the transport mechanism, and by recognizing the difference in the positions of the detection members when the detection members move to the farthest positions from the transport center line on the basis of the detection outputs of the position sensor. In this case, the peak value of the amount of movement of the detection members is recognized by peak holding means provided in the control section.

BRIEF DESCRIPTION OF THE DRAWINGS

FIGS. 7A and 7B show a rotation member provided in the locking mechanism shown in FIG. 6 in which FIG. 7A is a plan view and FIG. 7B is a side view;

DESCRIPTION OF THE PREFERRED EMBODIMENTS

The preferred embodiments will be described with reference to the accompanying drawings.

Figure 1:
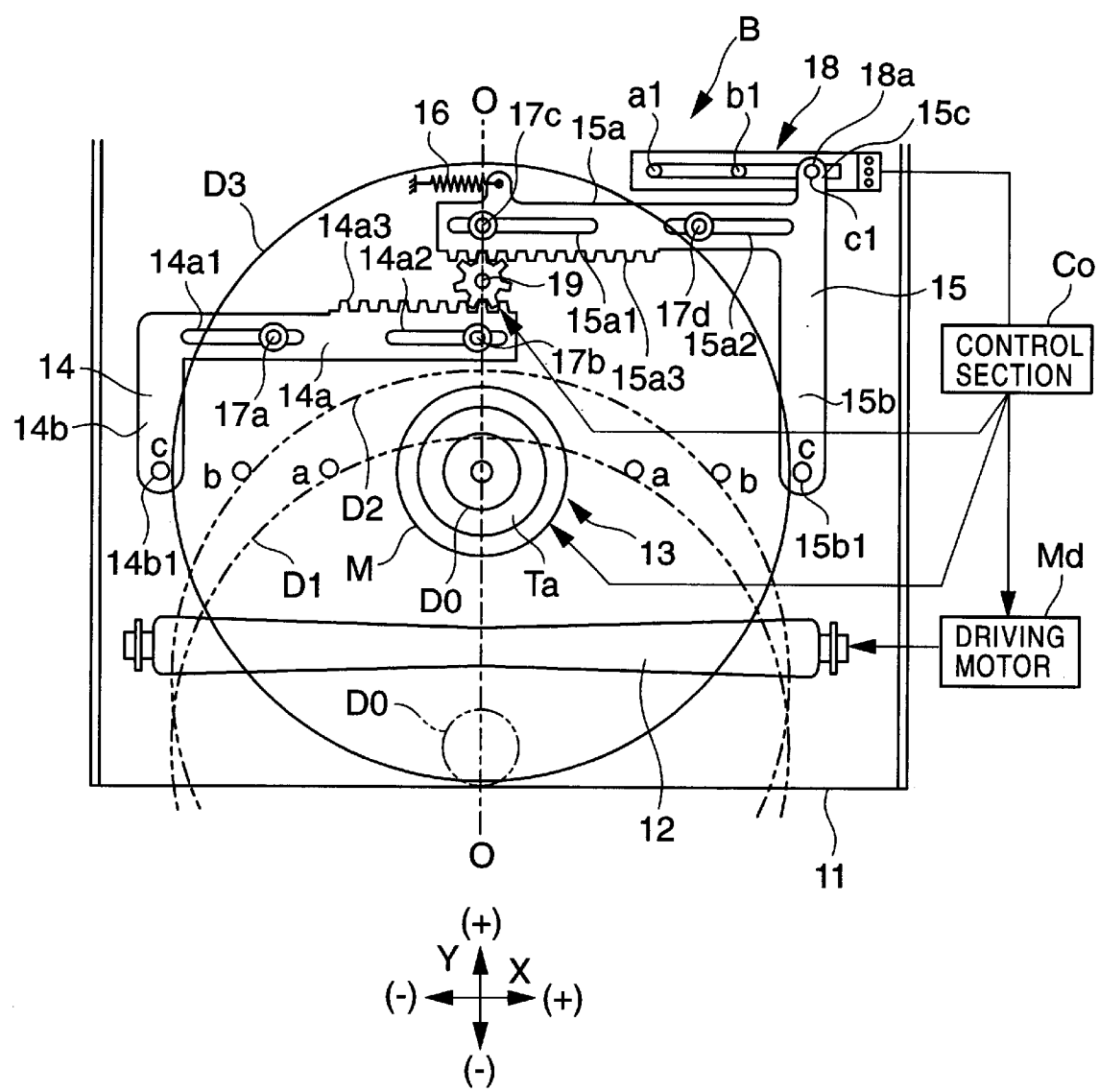
FIG. 1 is a plan view showing a first embodiment of a disk apparatus according to the present invention.

FIG. 1 is a plan view showing a first embodiment of a disk apparatus according to the present invention.

A disk apparatus B can record and/or reproduce information on both small disks of 8 cm in diameter, and large disks of 12 cm in diameter.

In the disk apparatus B, a disk inserting opening 11 is provided on the negative side of the Y axis shown in the drawing. A disk transport mechanism consisting of transport rollers 12 for transporting a disk inside the apparatus is provided behind (on the positive side of the Y axis) the disk inserting opening 11. The transport rollers 12 include, for example, a pair of rollers provided in the heightwise direction of the disk inserting opening 11. Before inserting the disk, a space between the upper roller and the lower roller is opened widely, and the disk is inserted into the space. When the insertion of the disk is detected by detection means (not shown), the upper and lower rollers approach each other, and the disk is clamped between the rollers by a command from a control section Co. After the disk has been clamped, a rotation force is imparted from a driving motor Md to the transport rollers 12, so that the disk is transported toward a disk driving section 13 (in the positive direction of the Y axis). The disk driving section 13 includes a turntable Ta and a spindle motor M for turning the turntable Ta is provided behind (on the positive side of the Y axis) the transport roller 12.

Substantially L-shaped detection members 14 and 15 each having sliding portions 14a and 15a and detecting portions 14b and 15b are provided behind (the positive side of the Y axis) the disk driving section 13. Formed in one sliding portion 14a are elongated holes 14a1, and 14a2. Projecting pins 17a and 17b formed, for example, on the inner surface of a cover covering the disk apparatus B are inserted through the elongated holes 14a1 and 14a2, and the detection member 14 is supported by washers provided on the tips of the projecting pins 17a and 17b. Thus, the detection member 14 is slidable in the direction of the X axis. Similarly, projecting pins 17c and 17d are inserted through elongated holes 15a1 and 15a2 formed in the sliding portion 15a, whereby the detection member 15 is slidable in the direction of the X axis.

A rack 14a3 is formed on the positive side of the Y axis of the sliding portion 14a, and a rack 15a3 is formed on the negative side of the Y axis of the sliding portion 15a. As shown in FIG. 1, the racks 14a3 and 15a3 are formed at positions opposed to each other, and a pinion gear 19 is provided therebetween so that it can rotate freely. In this embodiment, the pinion gear 19 serves as a connecting member for connecting the pair of detection members 14 and 15 so as to move them simultaneously.

A biasing member 16, such as a coil spring, is attached to the sliding portion 15a of the detection member 15, whereby the overall detection member 15 is biased in the negative direction of the X axis. Therefore, the detection members 14 and 15 are always biased through the pinion gear 19 in a direction to approach each other.

Detecting pins 14b1 and 15b1 projected from the ends of the negative side of the Y axis of the detecting portions 14b and 15b so as to be symmetric with respect to a transport center line O—O of the disk which passes through the center of the turntable Ta and is in parallel with the Y axis. The detecting pins 14b1 and 15b1 are pressed into contact with the outer periphery of the disk in transportation so as to allow the center of the disk to coincide with the transport center line O—O. In addition, the positions of the detecting pins 14b1 and 15b1 in the direction of the disk transport (the direction of the Y axis) are on the line which passes through the center of the turntable Ta and is perpendicular to the transport center line O—O. The detecting pins 14b1 and 15b1 are provided at equal distances from the turntable Ta. Thus, when the detecting pins 14b1 and 15b1 come close to or separate from each other, they are always located at equal distances from the transport center line O—O and the turntable Ta.

In the example shown in FIG. 1, a protrusion 15c protruding in the positive direction of the Y axis is formed at the corner of the sliding portion 15a and the detecting portion 15b of the detection member 15. A position sensor 18 (linear position sensor) for covering the overall sliding area of the protrusion 15c in the direction of the X axis is formed below the protrusion 15c, and a measuring pin 18a extending from the position sensor 18 is connected to the protrusion 15c. The position sensor 18 is the sensor for detecting the present position of the measuring pin 18a. For example, when the left end of the position sensor 18 is taken as a reference point, a resistance value between the reference point and the measuring pin 18a changes continuously due to the position of the measuring pin 18a, and the amount of change is measured as a voltage drop. The measurement value from the position sensor 18 is transmitted to the control section Co provided in the disk apparatus B.

The control section Co consists of a CPU, a memory, and so forth, receives detection outputs from the position sensor 18, and totally manages the spindle motor M for driving the turntable Ta, and the driving motor Md for driving the transport rollers 12 to perform controlling.

A method of locating disks, and a method of discriminating the disks using the disk apparatus of the first embodiment will now be described.

In FIG. 1, positions of a disk are indicated in the order of reference numerals D1 to D3, positions of the detecting pins 14b1 and 15b1 are indicated in the order of marks a, b, and c, and positions of the measuring pin 18a are indicated in the order of reference numerals a1, b1, and c1, respectively.

Before the insertion of the disk, the detection members 14 and 15 receive the biasing force of the biasing member 16 to be located close to each other, and the detecting pins 14b1 and 15b1 are located at the positions a and a shown in FIG. 1. Thus, the disk inserted into the disk apparatus B at the position D1 abuts against the detecting pins 14b1 and 15b1 located at the positions a and a, respectively. At this time, the measuring pin 18a of the position sensor 18 is located at the position a1.

When the disk is transported by the transport rollers 12 in the positive direction of the Y axis, the detecting pins 14b1 and 15b1 slide on the edge of the disk, and are pressed and opened so as to move in a direction to separate from each other on the X axis along the peripheral shape of the disk. The disk is clamped from both sides by the detecting pins 14*b*1 and 15*b*1, and transported in the positive direction of the Y axis while being centered by the biasing force of the biasing member 16 so that its center coincides with the transport center line O—O.

When the disk reaches the position D2, the detecting pins 14*b*1 and 15*b*1 are located at the positions b and b, respectively. At this time, the measuring pin 18*a* also moves in the positive direction of the X axis so as to be located at the position b1. When the disk is further inserted to reach the position D3 (the position of the maximum width of a disk of 12 cm in diameter), the detecting pins 14*b*1 and 15*b*1 are located at the positions c and c, respectively, the farthest from the transport center line O—O. At this time, the measuring pin 18*a* is located at the position c1.

The control section Co discriminates the diameter of the transported disk on the basis of the detection outputs from the position sensor 18 located at the position corresponding to the position of the measuring pin 18*a*.

In addition, since the center of the turntable Ta is located on a line connecting the detecting pins 14*b*1 and 15*b*1, the driving center of the turntable Ta is located directly below a center hole D0 of the disk when the detecting pins 14*b*1 and 15*b*1 are located at the positions c and c, respectively. The control section Co recognizes the location of the center of the disk on the turntable Ta by detecting the arrival of the measuring pin 18*a* at the position c1 and at the same time, a command (signal) for stopping the disk transport by the driving motor Md is output from the control section Co. Thereafter, the clamping condition of the disk by the transport rollers 12 is released, and the disk is placed on the turntable Ta so as to be clamped by clamping members (not shown).

A method of positioning disks and a method of discriminating the disks in this embodiment will now be described in more detail.

Figure 2:
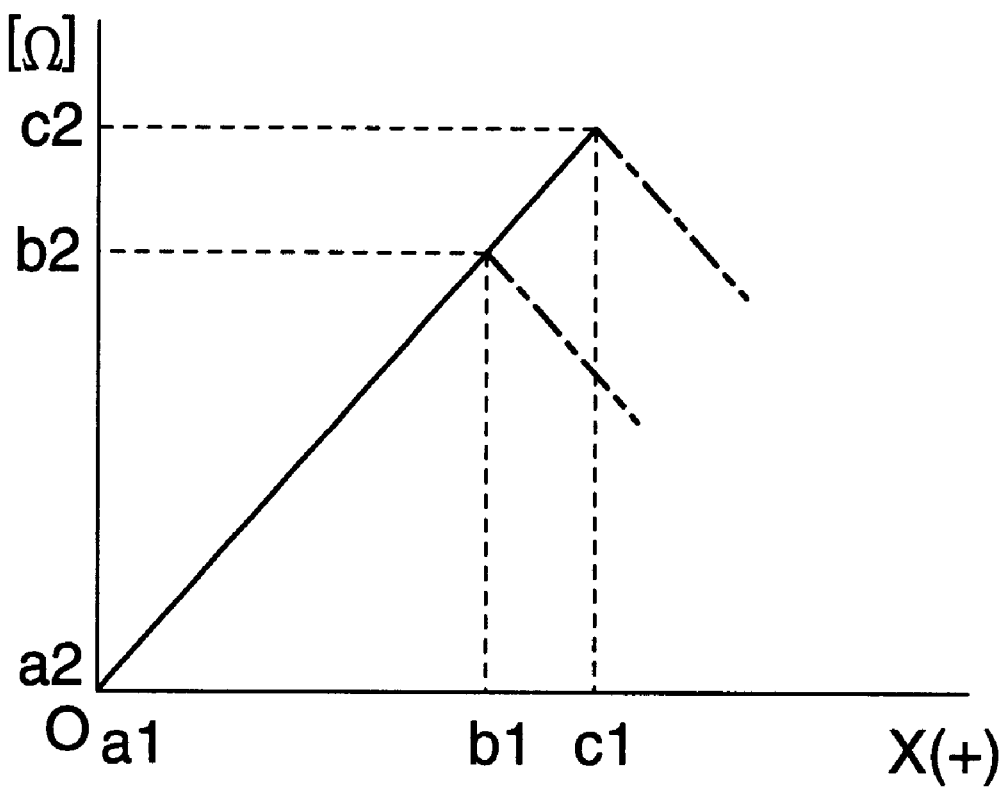
FIG. 2 is a graph showing the relationship between the position of a disk and detection outputs from a position sensor.

FIG. 2 is a graph showing the relationship between the position of the measuring pin 18*a* of the position sensor 18 and the resistance value on the basis of the position.

The measuring pin 18*a* in the position sensor 18 moves in the direction of the X axis in response to the movement of the detection member 15. When the detecting pin 15*b*1 is located at the position a, the measuring pin 18*a* is located at the position a1, closest to the negative side of the X axis, and the position a1 is shown as a reference point 0 in FIG. 2. When the detecting pin 15*b*1 moves to the positions a, b and c, the measuring pin 18*a* also moves in the positive direction of the X axis to the positions a1, b1, and c1, respectively. In addition, reference numeral a2 in FIG. 2 shows a resistance value of the position sensor 18 when the measuring pin 18*a* is located at the position a1, and the resistance value at this time is a reference value (for example 0 ($\Omega$)). The resistance value of the position sensor 18 increases as the measuring pin 18 moves in the positive direction of the X axis.

For example, in case the disk inserted into the inserting opening 11 is a disk of 12 cm in diameter, such as a CD or a DVD, the resistance value in FIG. 2 shows the largest value (peak value; c2 ($\Omega$)) when the measuring pin 18*a* moves to the position c1 (the detecting pin 15*b*1 is located at the position c). In case the inserted disk is a disk of 8 cm in diameter, such as an SD, the resistance value shows the largest value (peak value; b2 ($\Omega$)) when the measuring pin 18*a* moves to the position b1 (the detecting pin 15*b*1 is located at the position b). Since the peak values of the resistance value of the position sensor 18 differ in accordance with the diameters of the disks, the diameters of the disks can be discriminated by recognizing the peak values with the control section Co; the setting of the rotation speed, etc. at the time of driving the disk can be promptly and easily switched by the control section; and an independent disk discriminating device is not required, so that a reduction in cost can be achieved.

Since the detecting pins 14*b*1 and 15*b*1 always press the edge of the disk, the detecting pins 14*b*1 and 15*b*1 approach each other and the detection output of the position sensor 18 drops from the above peak value (see FIG. 2) when the maximum width portion of the disk passes between the detecting pins 14*b*1 and 15*b*1 and the disk further moves in the positive direction of the Y axis.

The control section Co monitors the detection output of the position sensor 18 as an output voltage, stores the peak value of the output voltage (the voltage value corresponding to b2 or c2), and outputs a command for stopping the transport rollers 12 at the time when the output voltage starts to drop from the peak value. When an inertial force due to the rotation of the transport rollers 12 is great, the transport rollers 12 rotate slightly even when the driving motor Md of the transport rollers 12 is stopped, and the disk stops at the position slightly moved in the positive direction of the Y axis from the stop position of the drive motor Md. At this time, since the resistance value of the position sensor becomes lower than the peak value (b2 or c2), a command for reversing the rotation of the transport rollers 12 is output from the control section Co to return the disk in the negative direction of the Y axis, and the driving motor Md is stopped at the time when the detection output from the position sensor 18 coincides with the peak value held by the control section Co, whereby the center hole D0 of the disk can be located directly above the turntable Ta.

When the location of the disk at a predetermined position over the turntable Ta is recognized by the control section Co, a command for clamping the disk is output from the control section Co. The lower roller moves in the direction to separate from the upper roller on the basis of the command, whereby the clamping condition of the disk is released and the disk is placed on the turntable Ta, and the disk is clamped by a disk clamp mechanism (not shown) on the turntable Ta. Thereafter, the disk is rotated by the spindle motor M provided in the disk driving section 13, and a recording or a reproducing operation of information on the disk is performed by a head member (not shown).

Incidentally, in case the line connecting the detecting pins 14*b*1 and 15*b*1 is located on the negative or positive side of the Y axis from the driving center of the turntable Ta, the time when the detection output from the position sensor 18 increases to the peak value (b2 or c2) does not agree with the time when the center of the disk coincides with the driving center of the turntable Ta. In this case, if the detection output from the position sensor 18 output when the disk is located in advance of the driving center of the turntable Ta is stored in the memory of the control section Co and the transport of the disk is stopped when the detection output from the position sensor 18 agrees with the above stored value, the center of the disk can be located at the driving center of the turntable Ta.

In addition, if the detection outputs of the position sensor 18 output when disks having different diameters are located on the turntable Ta are stored in advance in the memory of the control section Co, the disks can be located and the diameters of the disks can be discriminated simultaneously.

In case the line connecting the detecting pins 14*b*1 and 15*b*1 is located on the negative side of the Y axis from the driving center of the turntable Ta, the detection output from the position sensor 18 passes through the peak value (b2 or c2) during transporting the disk, so that the diameter of the disk can be discriminated before the location of the disk is completed. If the later detection output from the position sensor 18 is monitored by the control section Co and the transport of the disk is stopped when the output value in the locating condition responsive to the diameter of the disk (the value stored in the memory of the control section) agrees with the value of the detection output from the position sensor 18, the disks having different diameters can be located at predetermined positions on the turntable Ta.

Figure 3A:
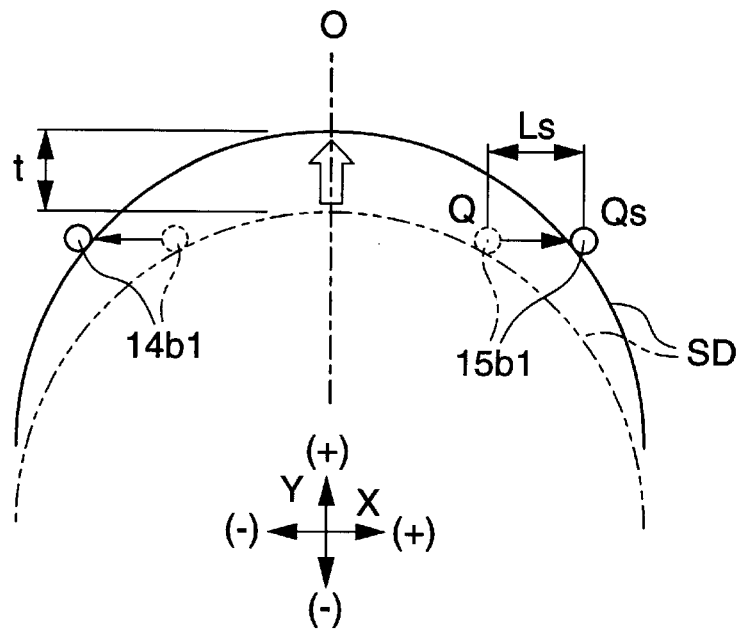
FIGS. 3A and 3B are illustrations each showing an example of a method of discriminating the disk according to the present invention.
Figure 3B:
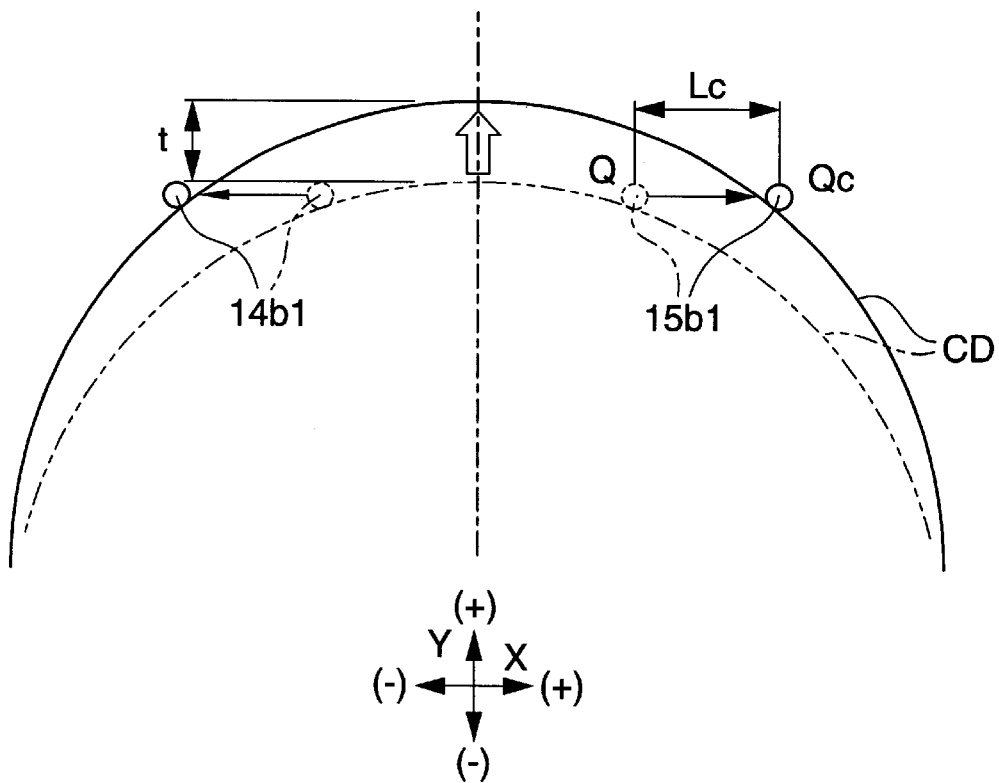

FIGS. 3A and 3B are illustrations showing another method of discriminating the disk using the above disk apparatus, in which FIG. 3A shows a case where the disk to be transported is a small diameter 8 cm-disk, and FIG. 3B shows a case where the disk to be transported is a large diameter 12 cm-disk.

As shown in FIGS. 3A and 3B, in both cases of the small diameter 8 cm-disk and the large diameter 12 cm-disk, the detecting pin 15b1 initially abuts against the inserted disk at the position Q shown by broken lines. Marks Qs and Qc show the positions of the detecting pin 15b1 when the disks are transported in the positive direction of the Y axis within a fixed time period t after abutting against the detecting pin 15b1. The mark Qs shows the moved position of the detecting pin 15b1 in the case of the small-diameter disk, and the mark Qc shows the same in the case of the large-diameter disk. In both cases of the small and large diameter disks, the transport speed of the disks is fixed, so that moving distances of the disks in the direction of the Y axis within the fixed time period t are the same.

As shown in FIG. 3A, in the case of the small-diameter disk SD, the detecting pin 15b1 moves a distance Ls from the position Q to the position Qs within the fixed time period t. On the other hand, in the case of the large-diameter disk CD, as shown in FIG. 3B, the detecting pin 15b1 moves a distance Lc from the position Q to the position Qc within the fixed time period t.

Since the detecting pin 15b1 moves along the edge of the disk, the distance Lc is longer than the distance Ls (Ls<Lc) due to the difference in diameter between the disk SD of 8 cm in diameter and the disk CD of 12 cm in diameter. The control section Co can discriminate the diameter of the inserted disk by judging the distance Ls or Lc on the basis of a threshold value L0 and the time period t. The threshold value L0 is set to (Ls+Lc)/2, for example, and the threshold value L0 is stored in the control section Co in advance. When the moving distance Lx of the detecting pin 15b1 actually measured by the position sensor 18 is smaller than the threshold value L0, the control section Co judges that the inserted disk is the small-diameter disk, and judges that the inserted disk is the large-diameter disk when the moving distance Lx is larger than the threshold value L0. The time period t may be counted by a timer and may be calculated by measuring the number of rotations or the rotation angle of the transport rollers 12. The rotation angle of the transport rollers 12 can be measured easily by using a stepping motor as the driving motor Md for driving the transport rollers 12.

In addition, the ratio of the moving distance of the detecting pin 15b1 to the time period t can be recognized as speed. The speed Vs of the detecting pin 15b1 in the case of the small-diameter disk is (Ls/t), the speed Vc in the case of the large-diameter disk is (Lc/t), and the speed Vs is slower than the speed Vc.

Here, the speed V0 equivalent to a disk of an intermediate diameter (the outer diameter of 10 cm, for example) between the small-diameter disk and the large-diameter disk is set as a "threshold valueo" (for example, V0=(Vs+Vc)/2), the threshold value (speed V0) is stored in the memory of the control section Co, and the speed obtained by the above discriminating method is compared with the threshold value. This comparison enables the discrimination of the diameter of the transported disk.

As described above, according to the method of discriminating the disk shown in FIG. 3, the diameter of the inserted disk can be discriminated when the disk moves by a short distance in the direction of the Y axis. Therefore, in the disk apparatus B shown in FIG. 1, the diameter of the disk can be discriminated immediately after the disk is transported and the detecting pins 14b1 and 15b1 start to move, and the later location control of the disk with respect to the turntable Ta becomes easy. For example, when the disk of 8 cm in diameter is judged immediately after the disk has been transported, if the driving motor Md is stopped immediately at the time when the peak value of the detection output from the position sensor 18 reaches b2, the center of the disk can be made to coincide with the driving center of the turntable Ta.

The disk transport mechanism in the first embodiment shown in FIG. 1 may utilize a loading tray system described below.

Figure 4:
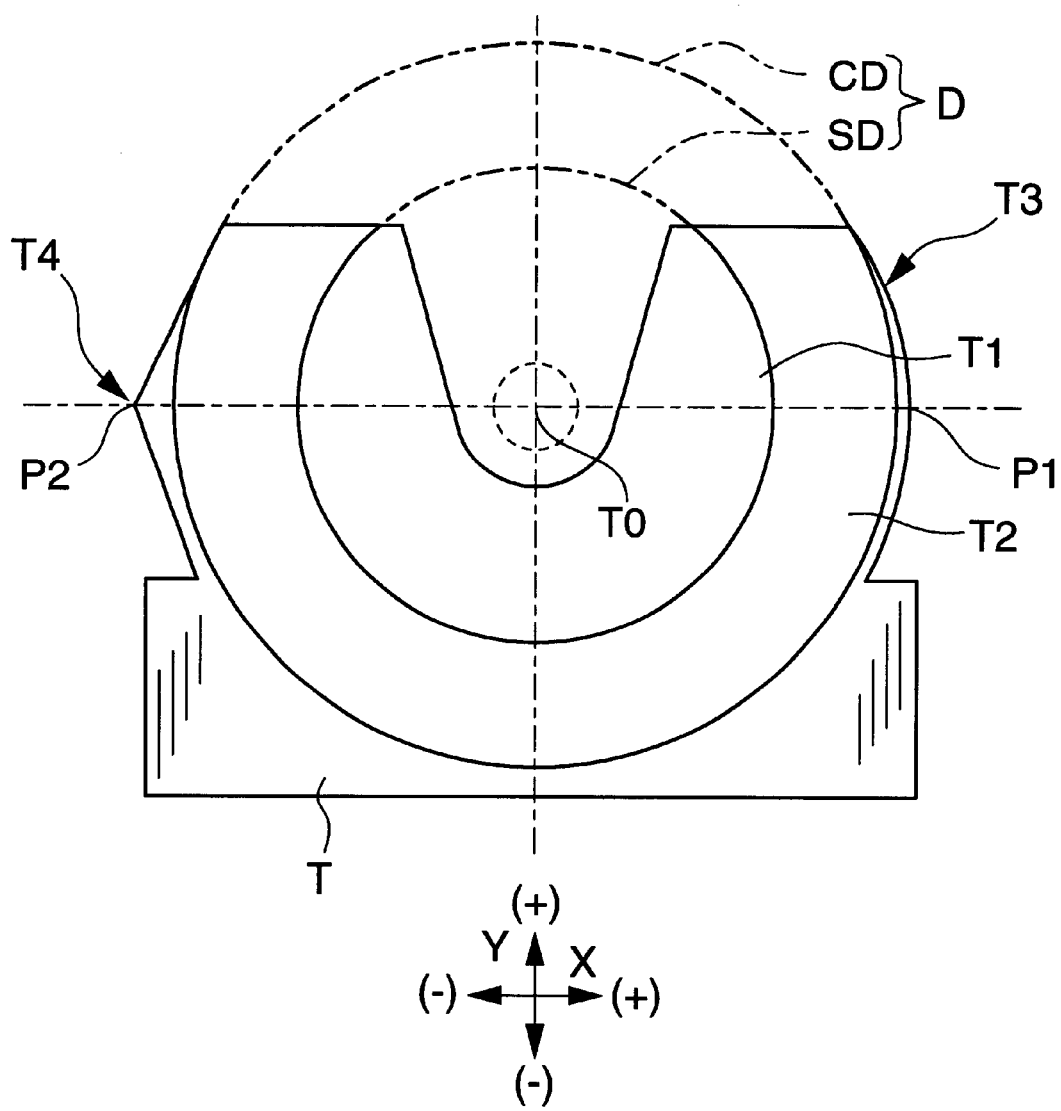
FIG. 4 is a plan view showing a tray for transporting the disk.

FIG. 4 is a plan view showing an example of a tray for transporting the disk used in the disk apparatus of the present invention.

The disk of 12 cm in diameter or the disk of 8 cm in diameter is placed on a tray T, and moved on the disk driving section 13 together with the tray T by a transport mechanism (not shown). One tray T may be provided and one disk is placed on the tray T to be transported together with the tray T, or a plurality of trays T may be accommodated in a magazine and any one of the trays T may be selected and pulled out to the disk driving section 13.

A circular recess T1 and/or recess T2 is formed in the upper surface of the tray T. When two recesses T1 and T2 are formed in one tray T, a step portion is provided between the recesses T1 and T2 so that the recess T2 is higher than the recess T1 by one stage. The disk of 8 cm in diameter, such as SD, is mounted on the recess T1, and the disk of 12 cm in diameter, such as CD, is mounted on the recess T2.

The left and right edges of the tray T are formed as follows. For example, the right edge shown as an edge T3 in FIG. 4 is formed into a circular-arc curve which is coaxial with the recesses T1, T2 and the disk D, or the left edge shown as inclined portion T4 in FIG. 4 is formed into a V-shaped projection such that it once projects from the tip (the positive side of the Y axis) of the tray T to the side (the negative side of the X axis), and returns toward the center of the tray T from a maximum width portion of the disk. In any event, they are formed so that the width of the tray T in the direction of the X axis becomes largest at the position of the largest width (largest diameter) of the mounted disk. At the edge T3 of the tray T, a portion P1 which is most projected sideward on the line which passes through the center T0 of the tray T and is perpendicular to the Y axis is a peak point. On the other hand, at the inclined portion T4, a portion P2 which is most projected sideward on the line which passes through the center T0 of the tray T and is perpendicular to the Y axis is a peak point.

By bringing the detecting pins 14b1 and 15b1 shown in FIG. 1 or detecting pin 35b and 38b shown in FIG. 7 to be described below into abutment with the edge T3 or the inclined portion T4, a detection output changing in response to the movement of the tray T and the disk D can be obtained from the position sensor 18. By performing the same control as that of the embodiment shown in FIG. 1 on the basis of the detection outputs, the center of the disk D on the tray T can be made to coincide with the driving center of the turntable Ta.

In addition, the periphery of the disk D on the tray T may be projected to both sides of the tray T so that the detecting pins 14b1 and 15b1, or the detecting pins 35b and 38b directly slide on the periphery of the disk D on the tray T. In this case, the detecting pins 14b1 and 15b1, or the detecting pins 35b and 38b also move with the movement of the tray T in the direction of the X axis in response to the outer peripheral shape of the disk D, and the disk D can be located on the tray T by detecting the positions of the detecting pins with the position sensor 18.

Figure 5:
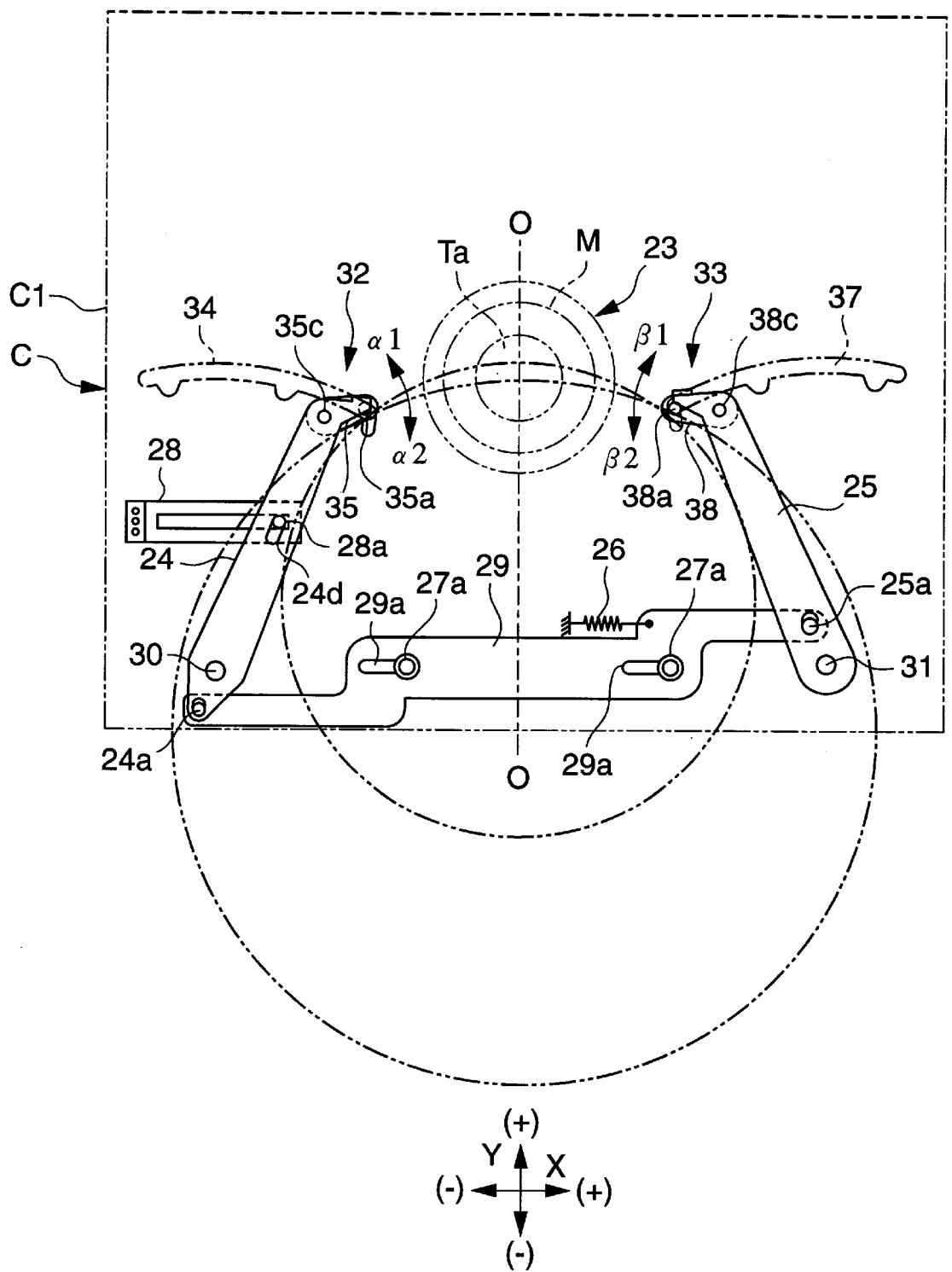
FIG. 5 is a plan view showing a second embodiment of a disk apparatus according to the present invention.

FIG. 5 is a plan view showing a second embodiment of the disk apparatus according to the present invention.

In the disk apparatus shown in FIG. 5, a pair of detecting arms (detection members) 24 and 25 are provided on the rear surface (inside) of a cover C1 (shown by the broken line) which covers a disk apparatus C. A disk driving section 23 consisting of a turntable Ta and a spindle motor M for driving the turntable Ta is provided between the detecting arms 24 and 25. In addition, the disk driving section 23 is provided with an optical head (not shown) for recording and/or reproducing information on a disk.

The detecting arms 24 and 25 are rotatably supported using spindles 30 and 31 formed on the negative side of the Y axis of the cover C1 as fulcrums. In addition, a stepwise connecting lever (connecting member) 29 is provided on the negative side of the Y axis of the cover C1, and elongated holes 29a and 29a are formed in the connecting lever 29. Projections 27a and 27a formed on the cover C1 are inserted through the elongated holes 29a and 29a, respectively, and the connecting lever 29 is slidably supported by the projections 27a and 27a in the direction of the X axis. The end of the negative side of the X axis of the connecting lever 29 is connected to a spindle 24a, which is provided on the negative side of the Y axis from the spindle 30 of the he detecting arm 24, so that the connecting lever 29 is not prevented from moving in the direction of the X axis. In addition, the end of the positive side of the X axis of the connecting lever 29 is connected to a spindle 25a, which is provided on the positive side of the Y axis of the detecting arm 25, so that the connecting lever 29 is not prevented from moving in the direction of the X axis. Thus, if the connecting lever 29 moves to the negative side of the X axis, the detecting arm 24 rotates clockwise about the spindle 30 and at the same time, the detecting arm 25 rotates counterclockwise about the spindle 31.

In the second embodiment, the detecting arms 24 and 25 serve as detection members for locating a disk, and the connecting lever 29 serves as a connecting member for moving the detection arms 24 and 25 simultaneously.

The connecting lever 29 is always biased by a biasing member 26, such as a coil spring, in the negative direction of the X axis. Thus, the detecting arm 24 is biased clockwise, and the detecting arm 25 is biased counterclockwise.

An elongated hole 24d is formed in the middle of the detecting arm 24. A position sensor 28 extending in the direction of the X axis is provided between the elongated hole 24d and the cover C1. Similarly to the first embodiment, a measuring pin 28a provided on the position sensor 28 and slidable in the direction of the X axis is inserted through the elongated hole 24d. The measuring pin 28a moves in the negative direction of the X axis as the detecting arm 24 rotates counterclockwise, whereby the amount of movement of the detecting arm 24 can be measured.

Figure 6:
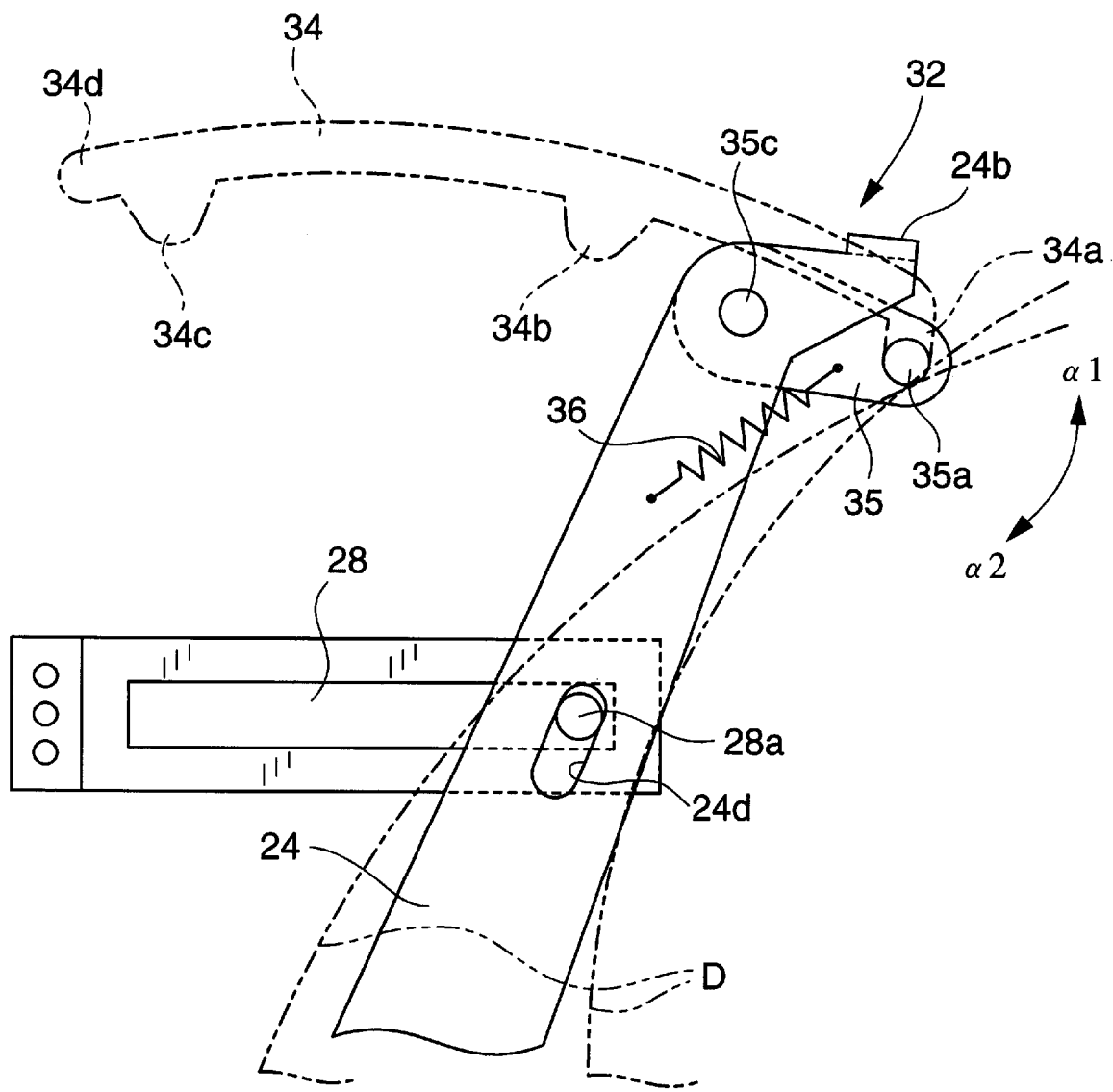
FIG. 6 is an enlarged plan view showing a locking mechanism for locking a detection member.
Figure 7A:
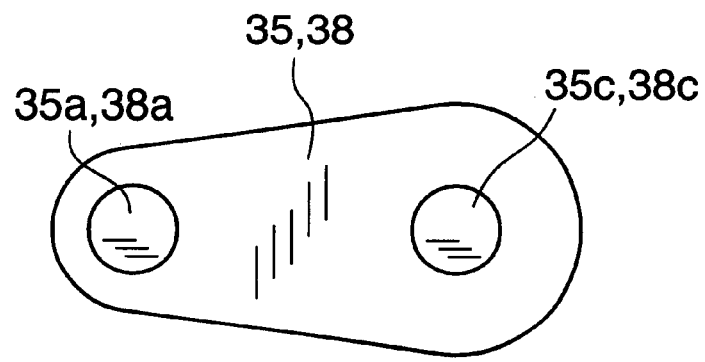

Locking mechanisms 32 and 33 are provided at the tips of the positive side of the Y axis of the detecting arms 24 and 25, respectively. FIG. 6 is an enlarged plan view showing one locking mechanism 32, FIG. 7A is a plan view of a rotation member constituting the locking mechanism, and FIG. 7B is a side view of the rotation member.

The locking mechanism 32 mainly consists of a cam slot 34 (shown by broken lines) formed in the shape of a circular arc in the cover C1, and a rotation member 35 rotatably provided on a bent portion of the tip of the detecting arm 24 through the spindle 35c.

A first recess 34a, a second recess 34b, and a third recess 34c which are cut out in a U shape in the negative direction of the Y axis of the cam slot 34 are formed at predetermined intervals. In addition, the portion of the cam slot 34 extended in the negative direction of the X axis is a fourth recess 34d.

Figure 7B:
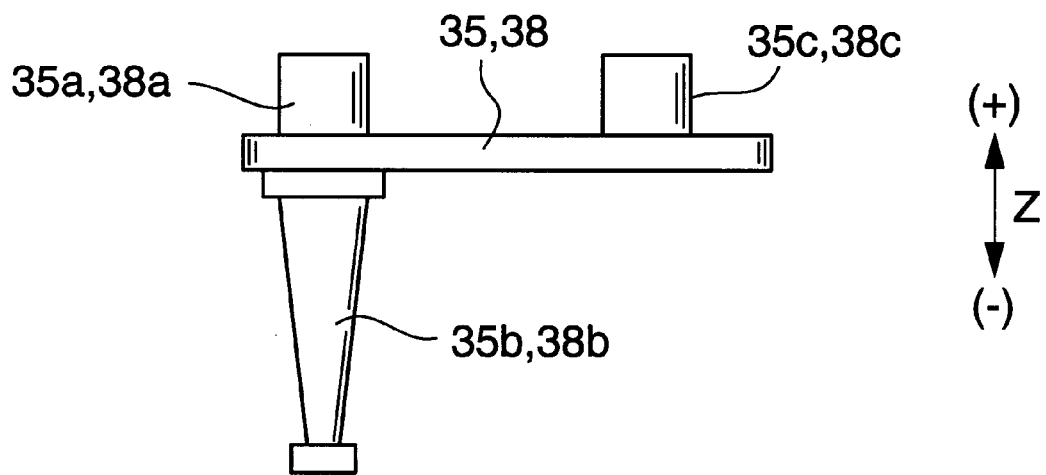

On the other hand, as shown in FIG. 7B, a guide pin 35a projecting in the positive direction of the Z axis and a detecting pin 35b projecting in the negative direction of the Z axis are coaxially provided on the rotation member 35. The guide pin 35a is inserted through the cam slot 34, and located in the first recess 34a in FIG. 6. The detecting pin 35b extends in such a manner that it projects toward the inside of a casing C, and can abut against the edge of the disk transported by a transport mechanism.

A spring 36 is provided between the rotation member 35 and the detecting arm 24, and the rotation member 35 is biased in a direction α2 about the spindle 35c. Thus, the guide pin 35 is always elastically pressed in the negative direction of the Y axis with respect to the cam slot 34. In FIGS. 5 and 6, the guide pin 35a is fitted into the first recess 34a of the cam slot 34 by means of the elastic force. Therefore, the detecting arm 24 cannot rotate even if a rotation force in the positive direction of the X axis is imparted to the connecting lever 29, i.e., a counterclockwise rotation force is imparted to the detecting arm 24 under the condition shown in FIG. 5.

When the rotation member 35 rotates in a direction α1, the guide pin 35a is removed from the first recess 34a and the detecting arm 24 is unlocked. At this time, the guide pin 35a can move in the cam slot 34, and the detecting arm 24 can rotate counterclockwise. A bent portion 24b projected from the plane of the drawing (the positive side of the Z axis) to the rear plane of the drawing (the negative side of the Z axis) is formed at the extreme tip of the detecting arm 24, so that the rotation of the rotation member 35 more than a predetermined angle in the direction α1 is controlled. Thus, more force than necessary is prevented from being exerted from the guide pin 35a to the cam slot 34, so that the detecting arm 24 can be rotated smoothly.

A locking mechanism 33 similar to the above locking mechanism 32 is provided on the tip of the detecting arm 25, and the locking mechanism 33 consists of a cam slot 37 and a rotation member 38. A first recess 37a, a second recess 37b, a third recess 37c, and a fourth recess 37d are formed in the cam slot 37 at predetermined intervals. A guide pin 38a and a detecting pin 38b are coaxially provided on the rotation member 38. Thus, the locking mechanisms 32 and 33 can move simultaneously symmetrical with respect to a transport center line O—O of the disk.

A method of locating/discriminating disks using the disk apparatus of the second embodiment will now be described.

When the disk is not inserted into the disk apparatus C, the connecting lever 29 moves in the negative direction of the X axis, the detecting arms 24 and 25 are maintained in the condition shown in FIG. 5, and the rotation members 35 and 38 are located at positions where they come closest to each other. In addition, the guide pins 35a and 38a are fitted to the first recesses 34a and 37a, respectively, and the detecting arms 24 and 25 are locked.

Under the condition where the detecting arms 24 and 25 are locked, when the disk is transported by the transport rollers 12 shown in FIG. 1 to the inside of the disk apparatus C in the positive direction of the Y axis, the periphery of the disk abuts against the detecting pins 35b and 38b provided on the rotation members 35 and 38, respectively. When the disk is further transported into the disk apparatus C, the disk presses the detecting pins 35b and 38b in the positive direction of the Y axis. Therefore, on the side of the locking mechanism 32, the rotation member 35 rotates in the direction a1, and the guide pin 35a is removed from the first recess 34a, so that the detecting arm 24 is unlocked. Similarly, on the locking mechanism 33, the rotation member 38 rotates in a direction β1, and the guide pin 38a is removed from the first recess 37a, so that the detecting arm 25 is unlocked. This allows the detecting arm 24 to rotate counterclockwise, and the detecting arm 25 to rotate clockwise so that the transport of the disk into the disk apparatus C is allowed.

Figure 8A:
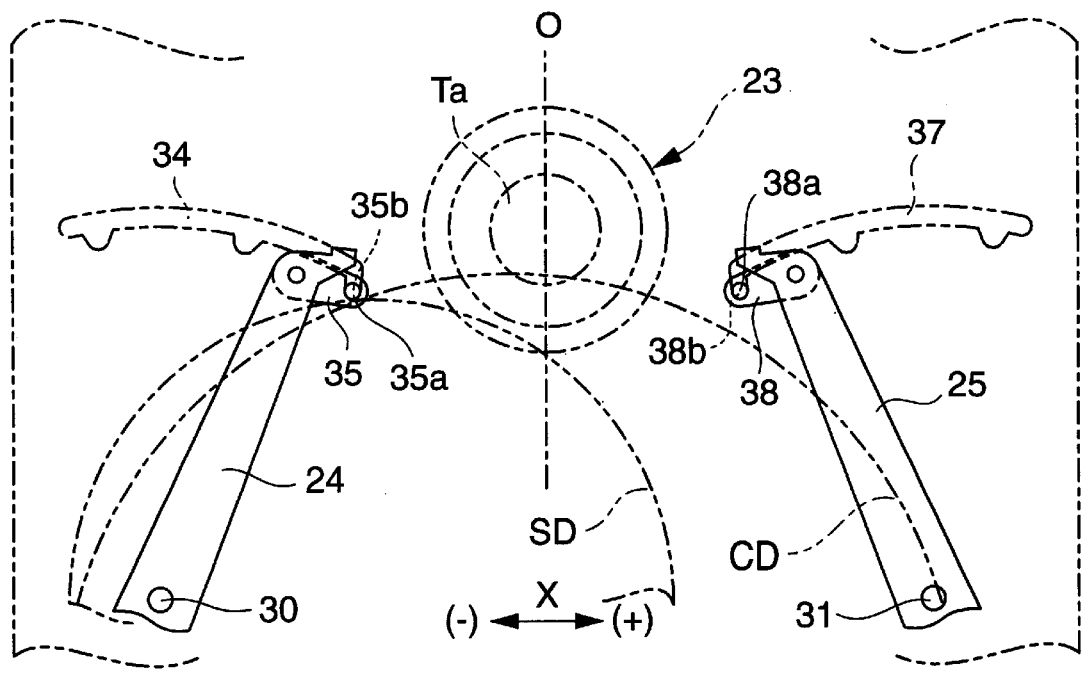
FIGS. 8A and 8B are illustrations each showing a centering operation when the disk abuts against one of the detection members so as be transported.
Figure 8B:
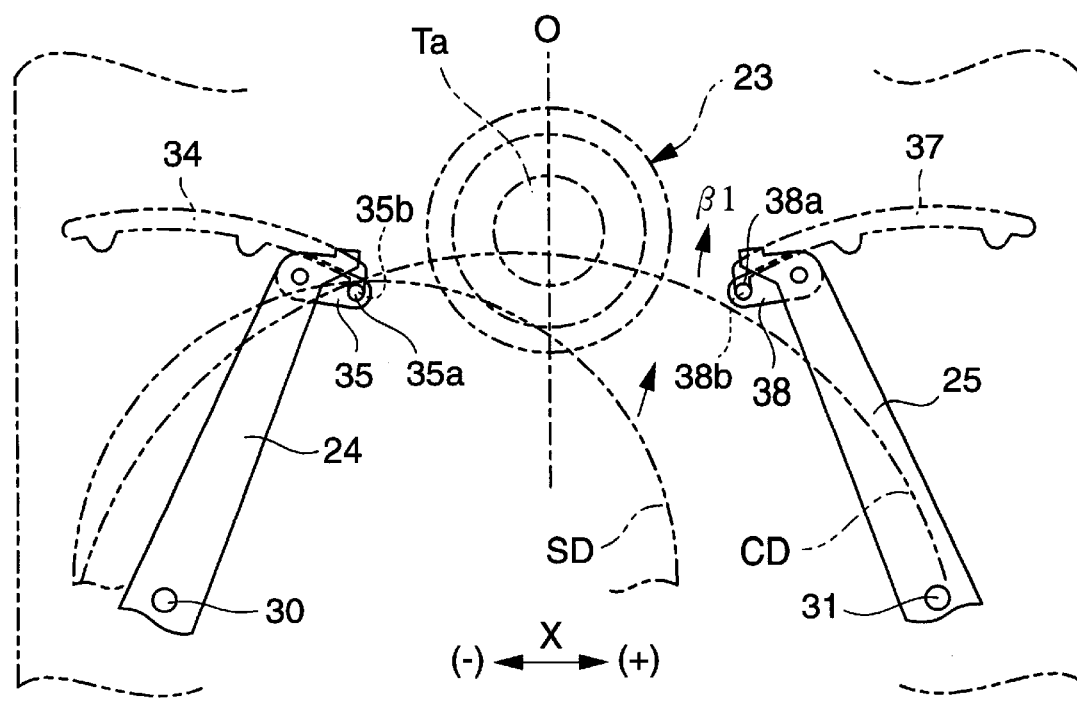

FIGS. 8A and 8B show a condition where the disk abuts against only one detecting pin, in which FIG. 8A shows a condition before releasing the locking, and FIG. 8B shows a condition after releasing the locking.

Referring to FIG. 8A, the disk (SD or CD) is transported in such a manner that it is shifted leftward (the negative side of the X axis) in the drawing from the transport center line O—O.

When the disk is transported in such a manner that it is shifted leftward from the transport center line O—O, the edge of the disk abuts against only the detecting pin 35b of the rotation member 35 located on the left side. When the disk is continuously transported in the positive direction of the Y axis, the guide pin 35a of the rotation member 35 is removed from the first recess 34a of the cam slot 34, so that the detecting arm 24 is unlocked, as shown in FIG. 8B. However, since the disk does not abut against the detecting pin 38b of the rotation member 38 located on the right side, the detecting arm 25 is not unlocked. Therefore, the detecting arms 24 and 25 connected by the connecting lever 29 cannot separate from each other, and the condition shown in FIG. 8B is maintained.

Under this condition, if a transporting force in the positive direction of the Y axis is continuously imparted to the disk, a counterclockwise rotation force using one detecting pin 35b as a fulcrum acts on the disk, and therefore the disk moves in the direction in which the center of the disk approaches the transport center line O—O. In case the transport rollers 12 shown in FIG. 1 are used as the transport mechanism, if each of the transport rollers 12 is formed into a tapered shape such that the diameter is the smallest at its center portion and increasing gradually to both ends, only both edges of the disk are always clamped by the transport rollers 12, so that the friction force between the disk and the transport rollers 12 is reduced and the disk can rotate easily using the detecting pin 35b as a fulcrum.

Thus, the disk is naturally centered, and its periphery abuts against the detecting pin 38b of the right-side rotation member 38 to press the detecting pin 38b in the direction of β1. Therefore, the guide pin 38a is also removed from the first recess 37a, and the detecting arm 25 is unlocked. This allows the locking mechanisms 32 and 33 to be unlocked, so that the transport of the disk into the disk apparatus C is allowed. When the disk is inserted and transported in such a manner that it is shifted rightward from the transport center line O—O, the disk is also centered similarly to the above description.

That is, according to the disk apparatus of this embodiment, even if the disk is transported in such a manner that it is shifted leftward or rightward from the transport center line O—O, the detecting arms 24 and 25 can be unlocked after the abutment of the disk against one of the detecting pins 35b and 38b has been corrected, and the disk has been moved to a correct position so that the center of the disk coincides with the transport center line O—O.

In addition, the second recesses 34b and 37b are provided in the middle of the cam slots 34 and 37, respectively. Thus, it is likely that the guide pins 35a and 38a are fitted in to the second recesses 34b and 37b, respectively, during the rotation of the detecting arms 24 and 25.

For example, after the guide pins 35a and 38a have been removed from the first recesses 34a and 37a, respectively, it is likely that the edge of the disk abuts against one of the detecting pins 35b and 38b, and only one detecting pin is pressed by the disk during the transport of the disk. In this case, either of the guide pins 35a or 38a which does not abut against the disk is fitted in to the second recess 34b or 37b at the time when the guide pins 35a and 38a reach the second recesses 34b and 37b, respectively, so that the detecting arms 24 and 25 are locked. At this time, the position of the disk is corrected so that it abuts against both detecting pins 35b and 38b and thereafter, the detecting arms 24 and 25 are unlocked. Therefore, after the guide pins 35a and 38a have passed through the second recesses 34b and 37b, the disk will abut against both of the detecting pins 35b and 38b, respectively, so that the disk is always transported while being centered by the detecting pins 35b and 38b.

The disk may still abut against only one detecting pin. However, the detecting arms 24 and 25 are locked again when the guide pins 35a and 38a reach the third recesses 34c and 37c, respectively, so that the disk certainly abuts against both of the detecting pins 35b and 38b at the time when the guide pins 35a and 38a pass through the third recesses 34c and 37c, respectively.

The second recesses 34b and 37b are formed at the positions where the guide pins 35a and 38a are fitted thereto immediately before the detecting pins 35b and 38b abut against the maximum width portion of the small-diameter disk and the peak value b2 (see FIG. 2) is output from the position sensor 28, and immediately before the small-diameter disk is located at a predetermined position over the turntable Ta. The third recesses 34c and 37c are formed at the positions where the guide pins 35a and 38a are fitted thereto immediately before the detecting pins 35b and 38b abut against the maximum width portion of the large-diameter disk and the peak value c2 (see FIG. 2) is output from the position sensor 28, and immediately before the large-diameter disk is located at a predetermined position over the turntable Ta.

Figure 9:
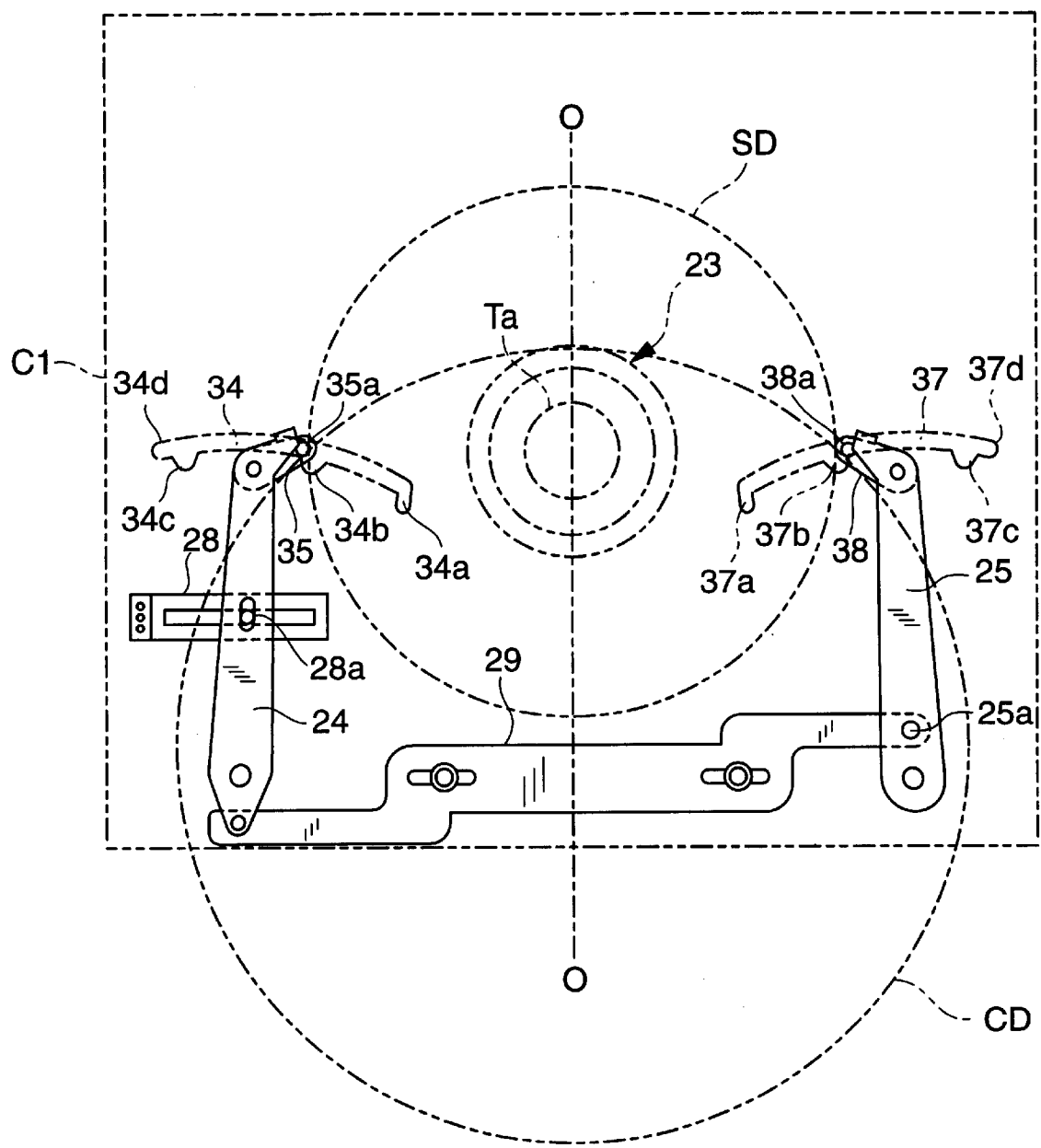
FIG. 9 is a plan view showing a state where a small-diameter disk is located on a turntable.

As shown in FIG. 9, the small-diameter disk is located in a condition where the center of the disk coincides with the driving center of the turntable Ta directly after the guide pins 35a and 38a have been removed from the second recesses 34b and 37b, respectively. Therefore, since the guide pins 35a and 38a pass through the second recesses 34b and 37b, respectively, immediately before they are removed from the second recesses 34b and 37b, if the disk abuts against one of the detecting pins 35b and 38b as described above, it is corrected. That is, the disk is certainly centered so that its center is located on the transport center line O—O immediately before the small-diameter disk coincides with the driving center of the turntable Ta, and immediately before the maximum width of the small-diameter disk is detected by the detecting pins 35b and 38b.

Similarly, when the large-diameter disk of 12 cm in diameter, such as a CD or a DVD, is located, the guide pins 35a and 38a pass through the third recesses 34c and 37c immediately before the completion of the location. Therefore, even if the disk abuts against either of the detecting pin 35b or 38b, it is certainly corrected. When the center of the large-diameter disk coincides with the driving center of the turntable Ta, the guide pins 35a and 38a are removed from the third recesses 34c and 37c, respectively, and reach the fourth recesses 34d and 37d. Thus, the large-diameter disk is certainly centered to be located over the turntable Ta.

In addition, since the measuring pin 28a moves in the negative direction of the X axis following the counterclockwise rotation of the detecting arm 24, the resistance value of the position sensor 28 has a peak value in the same manner as shown in the graph of FIG. 2. According to the disk apparatus C of this embodiment, the detection output from the position sensor 28 shows a peak value (b2 or c2 of FIG. 2) when the small-diameter disk or the large diameter disk is located over the turntable Ta.

As described above, the disk is certainly centered so that its center is located on the transport center line O—O immediately before the disk (SD or CD) coincides with the driving center of the turntable Ta, and immediately before the maximum width of the disk is detected by the detecting pins 35b and 38b, so that the disk uniformly abuts against the detecting pins 35b and 38b, and the detection value (the peak value b2 or c2) of the maximum width of the disk can be obtained without errors.

The disk can be prevented from abutting against either of the detecting pin 14b1 or 15b1 even when the locking mechanisms 32 and 33 of this embodiment are applied to the disk apparatus shown in FIGS. 3A and 3B. Therefore, the moving distances of the detecting pins 14b1 and 15b1 within the predetermined time period t can be detected accurately.

An order (signal) for stopping the disk transport is output from the control section Co (see FIG. 1) at the time when the position sensor 28 detects the peak value, and the disk transport by the transport mechanism is completed on the basis of the command, whereby the disk is located at a predetermined position over the turntable Ta. Thereafter, the disk is placed on the turntable Ta, and clamped by clamping mechanisms (not shown).

Incidentally, in case the line connecting the detecting pins 35b and 38b is shifted toward the Y axis from the center of the turntable Ta, if the detection output from the position sensor 28 output when the disk is located on the driving center of the turntable Ta is stored in advance in the memory of the control section Co and the transport of the disk is stopped when the detection output from the position sensor 28 agrees with the above stored value, the center of the disk can be located at the driving center of the turntable Ta, similarly to the description of the first embodiment shown in FIG. 1.

In the first embodiment shown in FIG. 1 and the second embodiment shown in FIG. 5, the detection members 14 and 15 or the detecting arms 24 and 25 may be preferably moved in the direction to separate from each other after the disk has been placed on the turntable and clamped so that a sliding friction is not imparted to the rotating disk.

In the first embodiment shown in FIG. 1, in case the disk after the completion of a reproducing operation or a recording operation is ejected in the negative direction of the Y axis, the biasing force of the biasing member 16 to return the detecting pins 14b1 and 15b1 toward the center of the disk can be utilized. That is, in FIG. 1, if the detection members 14 and 15 are held at positions separated from each other by a locking mechanism (not shown) during the rotation of the disk and unlocked when ejecting the disk, the disk will be pushed out in the negative direction of the Y axis by a returning force of the detecting pins 14b1 and 15b1.

In the second embodiment shown in FIG. 5, the detecting arms 24 and 25 are biased by the biasing member 26 in the direction to approach each other, so that the disk can be ejected in the negative direction of the Y axis using the biasing force. However, since the rotation members 35 and 38 are rotated upon receipt of biasing forces in the directions of $\alpha 2$ and $\beta 2$, respectively, it is likely that the guide pins 35a and 38a are locked in the third recesses 34c and 37c, and the second recesses 34b and 37b, respectively, when the detecting arms 24 and 25 return in the direction to approach each other and when the guide pins 35a and 38a pass through the third recesses 34c and 37c and the second recesses 34b and 37b, respectively. Thus, in order to prevent the locking, the rotation members 35 and 38 may be preferably biased in the directions of $\alpha 1$ and $\beta 1$, respectively, by an unlocking member (not shown) when the detecting arms 24 and 25 move in the direction to approach each other.

In the second embodiment shown in FIG. 5, the disk transport mechanism of a loading tray system shown in FIG. 4 can be applied.

In addition, in the first and second embodiments, a pair of detection members or detecting arms move in the direction of the X axis simultaneously, and a pair of detecting pins abut against the disk. However, the present invention in not limited thereto. For example, a disk may be transported into a disk apparatus while one of the right and left edges is contacting a fixed guide extending in the direction of the Y axis, and one detecting pin may be provided on the opposite side of the fixed guide so as to move in the direction of the X axis with the transport of the disk. In this case, the disk can also be located on the disk driving section by detecting the position of one detecting pin in the direction of the X axis.

Further, in the first and second embodiment shown in FIGS. 1 and 5, the location of the disk is completed when the detecting pins 14b1 and 15b1 or the detecting pins 35b and 38b move away from each other in the direction of the X axis with the movement of the disk in the direction of the Y axis, and the maximum outer diameter portion of the disk (the maximum width portion of the disk in the direction of the X axis) is located between the detecting pins 14b1 and 15b1, or the detecting pins 35b and 38b. However, the disk can be further moved in the positive direction of the Y axis after completion of the location of the disk.

Figure 10:
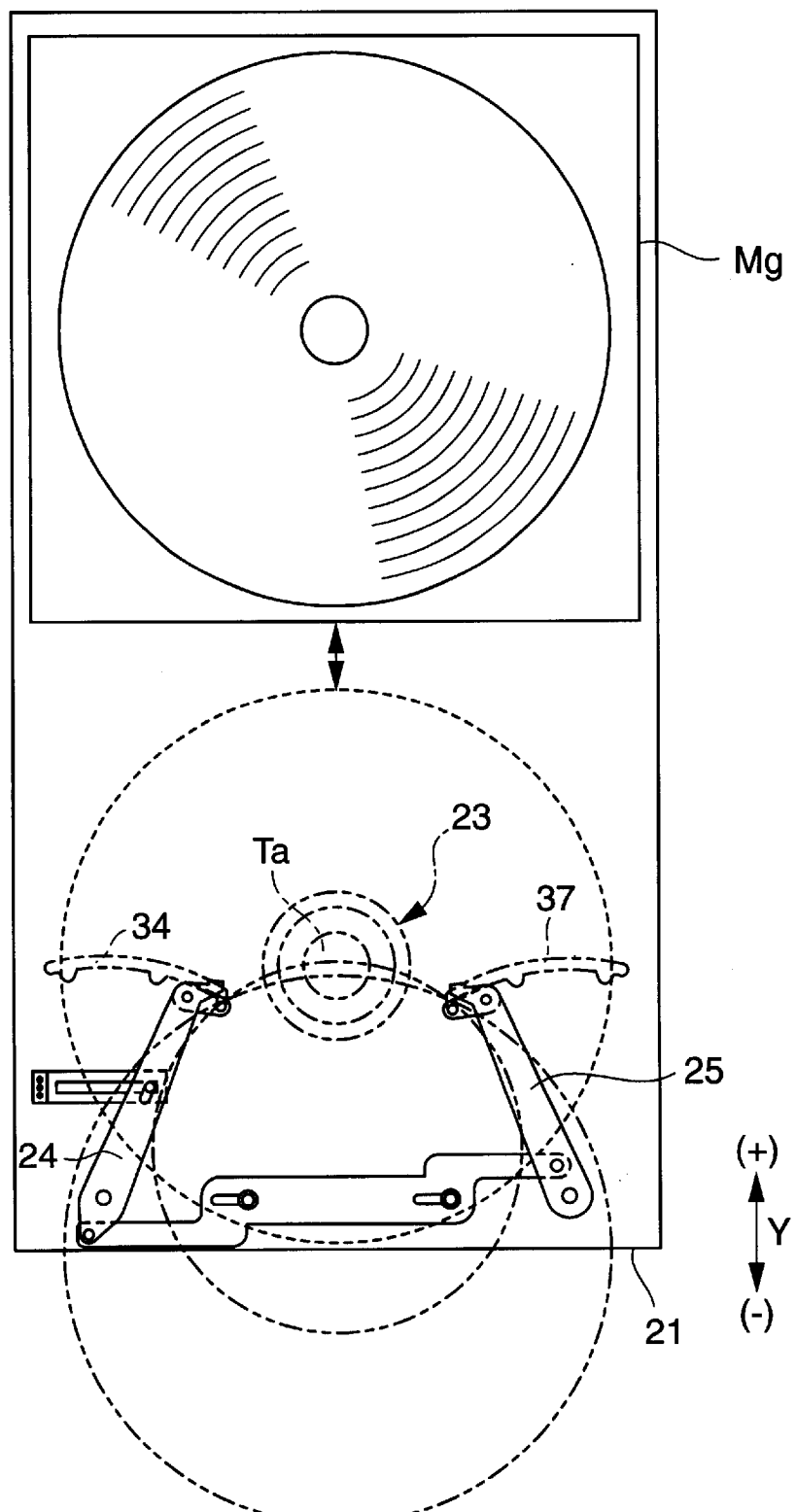
FIG. 10 is a plan view showing a modification of the disk apparatus of the second embodiment according to the present invention.
Figure 11:
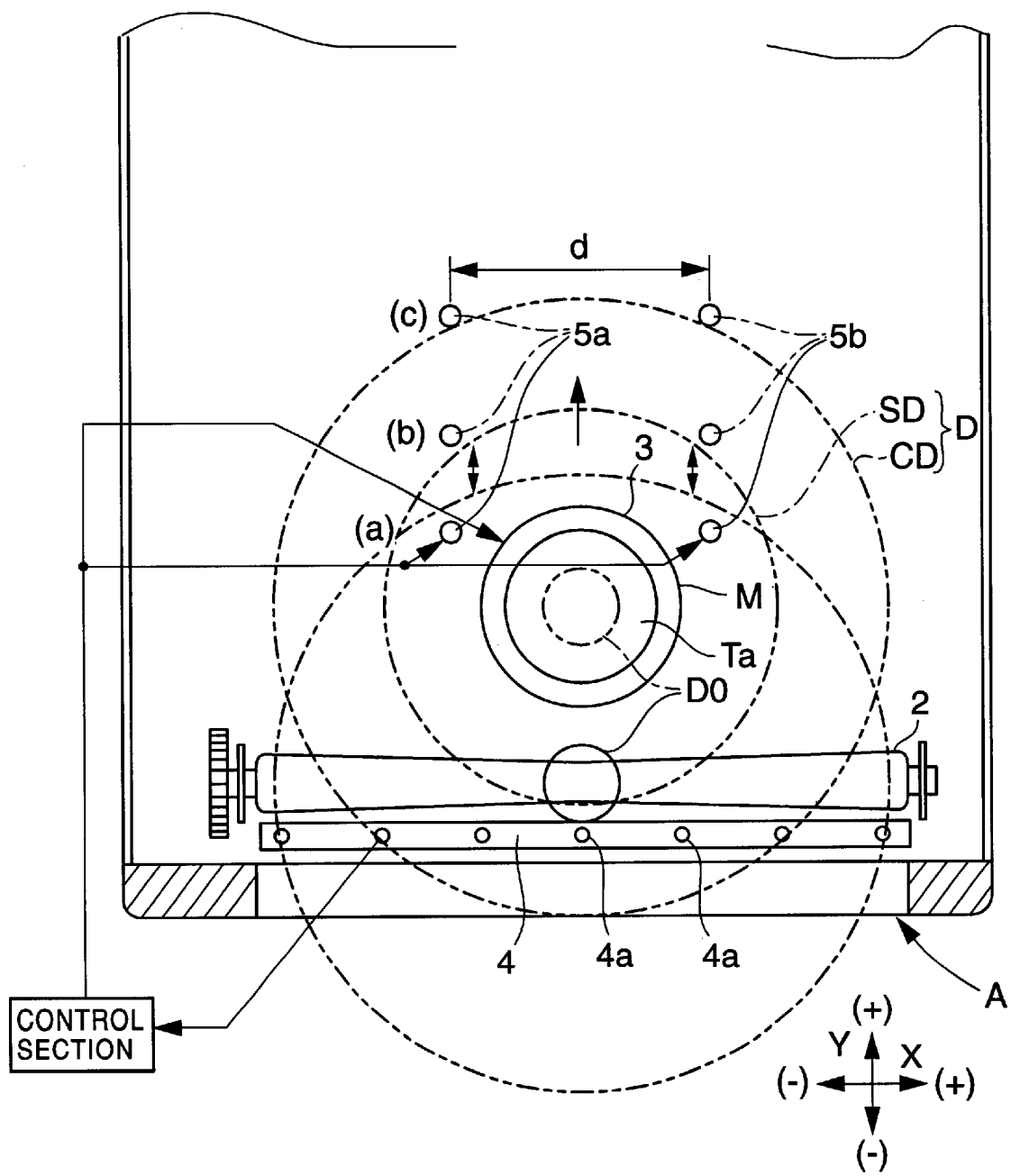
FIG. 11 illustrates a concept of a conventional disk apparatus.

Thus, it is possible to provide a magazine Mg for stocking the disk behind (the positive side of the Y axis) the disk driving section 23 in the disk apparatus, as shown in FIG. 10. In the disk apparatus shown in FIG. 10, the disk inserted from the disk inserting opening 21 in the positive direction of the Y axis may be ejected from the disk inserting opening 21 after being located and driven on the turntable Ta, or may be transported into the magazine Mg. It is also possible that the disk inserted from the disk inserting opening 21 is accommodated in the magazine Mg, and the disk is pulled out of the magazine Mg as needed so as to be located and driven on the turntable Ta. In this case, as shown in FIG. 1, by using the detection members 14 and 15 having the detecting pins 14b1 and 15b1 moving in parallel with the X axis, the connecting member (pinion gear 19) for connecting both of the detection members, and the position sensor 18 for detecting the movement of one of the detection members, both the disk transported from the disk inserting opening 21 toward the disk driving section 23, and the disk pulled out of the magazine Mg and transported to the disk driving section 23 can be located at predetermined positions over the turntable Ta.

By constructing the disk apparatus so that a plurality of disks can be stocked in the magazine Mg, the disk apparatus can be used as a so-called disk changing apparatus. The magazine Mg may be detachable from the disk apparatus, or may be fixedly provided in the disk apparatus.

The position sensor in the first and second embodiments may detect changes of the resistance value by magnetic changes or photo sensors.

According to the present invention as described above in detail, the disk apparatus capable of certainly locating disks on a turntable with a small number of components, and discriminating diameters of the inserted disks can be provided.

What is claimed is:

1. A disk apparatus comprising:
   a disk driving section having a turntable;
   a transport mechanism driven by a driving motor for transporting a disk toward said disk driving section;
   a detection member abutting against the edge of the disk to be transported and moving in a direction crossing the disk transport direction in accordance with the peripheral shape of the disk;
   a biasing member for biasing said detection member in a direction to be pressed into contact with the edge of the disk, and allowing the center of the transported disk to coincide with a transport center line passing through the center of said turntable;
   a position sensor for continuously detecting the position of said detection member during transport of the disk and providing an output corresponding to the position of said detection member as the detection member moves;
   and a control section for receiving a continual change of output of said position sensor corresponding to the position of said detection member as it moves and for stopping the transport of the disk transported by said transport mechanism when the movement of the disk to a predetermined position over said turntable is detected from said output of said position sensor.

2. A disk apparatus as claimed in claim 1, further comprising a second detection member, wherein the pair of detection members are provided at positions symmetric with respect to said transport center line, and a connecting member for connecting the detection members so that the pair of detection members each move by the same distance from said transport center line.

3. A disk apparatus as claimed in claim 2, further comprising a locking mechanism for locking said pair of detection members at positions to abut against the edge of the transported disk, and for unlocking said pair of detection members when the edge of the disk abuts against said pair of detection members simultaneously.

4. A method of discriminating disks using the disk apparatus as claimed in claim 2, wherein said transport mechanism can transport plural types of disks having different diameters, and said control section discriminates the diameters of the disks transported by said transport mechanism on the basis of the amount of movement of said detection members detected by said position sensor.

5. A method of discriminating disks as claimed in claim 4, wherein, when the time period when the disks are moved by predetermined amounts with the edges of the disks abutted against said detection members is taken as t, said control section discriminates the diameters of the disks on the basis of the amount of movement L of said detection members detected by said position sensor within said time period t.

6. A method of discriminating disks using the disk apparatus as claimed in claim 2, wherein said transport mechanism can transport plural types of disks having different diameters, and wherein said control section discriminates the diameters of the disks in transportation by monitoring the detection outputs from said position sensor when the disks are transported by said transport mechanism, and by recognizing the difference in the positions of said detection members when the detection members moved to the farthest positions from said transport center line on the basis of the detection outputs of said position sensor.

7. A disk apparatus as claimed in claim 1, wherein said detection member moves parallel to a line which passes through the center of said turntable and is perpendicular to said transport center line, and the disk is located at a predetermined position on said turntable when said detection member moves to the farthest positions from said transport center line.

8. A method of locating disks using the disk apparatus as claimed in claim 7, wherein, when the movement of said detection member to the farthest positions from said transport center line is detected by said position sensor, said control section stops the disk transported by said transport mechanism on the basis of the detection output from said position sensor.

9. A method of locating disks using the disk apparatus as claimed in claim 1, wherein an output value from said position sensor is stored in advance in said control section when the disk is located at a predetermined position on said turntable, and wherein said control section stops the disk transported by said transport mechanism when the detection output from said position sensor during the transport of the disk agrees with said output value.

10. A disk apparatus comprising:
    a disk driving section having a turntable which can drive plural types of disks of different diameters;
    a transport mechanism driven by a driving motor and capable of transporting said plural types of disks toward said disk driving section;
    a pair of detection members which are provided at positions symmetric with respect to a transport center line passing through the center of said turntable, and which abut against the edges of disks to be transported, and move in a direction crossing the transport direction of the disks in accordance with the peripheral shapes of the disks;
    a connecting member for connecting said pair of detection members so that the pair of detection members each move by the same distance from said transport center line;
    a biasing member for biasing said detection members in a direction to be pressed into contact with the edges of the disks;

a position sensor for continuously detecting the positions of said detection members during transport of the disk and providing an output corresponding to the positions of said detection members as the detection members move; and a control section for receiving a continual change of output of said position sensor corresponding to the positions of said detection members as they move and for stopping the transport of the disks transported by said transport mechanism when the movement of the disks to predetermined positions over said turntable is detected from said output of said position sensor.

11. A disk apparatus as claimed in claim 10, further comprising a locking mechanism for locking said pair of detection members at positions to abut against the edges of the transported disks, and for unlocking said pair of detection members when the edges of the disks abut against said pair of detection members simultaneously.

12. A disk apparatus as claimed in claim 10, wherein said detection members move parallel to a line which passes through the center of said turntable and is perpendicular to said transport center line, and the disks are located at predetermined positions on said turntable when said detection members move to the farthest positions from said transport center line.

13. A method of locating disks using the disk apparatus as claimed in claim 12, wherein, when the movement of said detection members to the farthest positions from said transport center line is detected by said position sensor, said control section stops the disks transported by said transport mechanism on the basis of the detection outputs from said position sensor.

14. A method of locating disks using the disk apparatus as claimed in claim 10, wherein output values from said position sensor are stored in advance in said control section when the disks are located at predetermined positions on said turntable, and wherein said control section stops the disks transported by said transport mechanism when the detection outputs from said position sensor during the transport of the disks agree with said output values.

15. A method of discriminating disks using the disk apparatus as claimed in claim 10, wherein said control section discriminates the diameters of the disks transported by said transport mechanism on the basis of the amount of movement of said detection members detected by said position sensor.

16. A method of discriminating disks as claimed in claim 15, wherein, when the time period when the disks are moved by predetermined amounts with the edges of the disks abutted against said detection members is taken as t, said control section discriminates the diameters of the disks on the basis of the amount of movement L of said detection members detected by said position sensor within said time period t.

17. A method of discriminating disks using the disk apparatus as claimed in claim 10, wherein said control section discriminates the diameters of the disks in transportation by monitoring the detection outputs from said position sensor when the disks are transported by said transport mechanism, and by recognizing the difference in the positions of said detection members when the detection members move to the farthest positions from said transport center line on the basis of the detection outputs of said position sensor.

18. A disk apparatus comprising:

a disk driving section having a turntable;

a transport mechanism driven by a driving motor for transporting a tray having a disk placed thereon toward said disk driving section;

detection members abutting against the edge of said tray transported by said transport mechanism or the edge of the disk on said tray, and moving in a direction crossing the transport direction of said tray in accordance with the shape of said tray or the peripheral shape of the disk;

a biasing member for biasing said detection members in a direction to be pressed into contact with the edge of said tray or the edge of the disk on said tray;

a position sensor for continuously detecting the positions of said detection members during transport of the disk on said tray and providing an output corresponding to the positions of said detection members as the detection members move; and a control section for receiving a continual change of output of said position sensor corresponding to the positions of said detection members as they move and for stopping the transport of said tray transported by said transport mechanism when the movement of the disk on said tray to a predetermined position over said turntable is detected from said output of said position sensor.

19. A method of locating disks using the disk apparatus as claimed in claim 18, wherein an output value from said position sensor is stored in advance in said control section when the disk on said tray is located at a predetermined position on said turntable, and wherein said control section stops said tray transported-by said transport mechanism when the detection output from said position sensor during the transport of the disk agrees with said output value.

* * * * *